(12) United States Patent
Anderson et al.

(10) Patent No.: US 6,413,590 B1
(45) Date of Patent: Jul. 2, 2002

(54) GLOSSY INK JET MEDIUM

(75) Inventors: Brian L. Anderson, Westfield; Andrew J. Naisby, Northampton; Everett W. Bennett, Easthampton; Jimal D. Hadla, Westfield; Leonard R. Gemme, Belchertown, all of MA (US)

(73) Assignee: Rexam Graphics Inc., South Hadley, MA (US)

( * ) Notice: Subject to any disclaimer, the term of this patent is extended or adjusted under 35 U.S.C. 154(b) by 16 days.

(21) Appl. No.: 09/584,106

(22) Filed: May 31, 2000

(51) Int. Cl.$^7$ .................................................. B05D 3/02
(52) U.S. Cl. .............................. 427/385.5; 427/389.9; 427/391; 427/395; 427/417; 101/494
(58) Field of Search .............................. 427/389.9, 392, 427/391, 395, 372.2, 411, 417, 428, 385.5; 101/494

(56) References Cited

U.S. PATENT DOCUMENTS 5,766,398 A  6/1998  Cahill et al.
5,798,397 A  * 8/1998 Noguchi et al. .............. 522/81

FOREIGN PATENT DOCUMENTS

WO    WO97/33758    9/1997

* cited by examiner

Primary Examiner—Shrive P. Beck
Assistant Examiner—Rebecca A. Blanton
(74) Attorney, Agent, or Firm—Burns, Doane, Swecker & Mathis, L.L.P.

(57) ABSTRACT

Provided is a UV-curable ink jet coating comprised of a copolymer or mixture of polyvinyl alcohol and polyethylene oxide, and a water-soluble polymer which can act as an electron and/or proton donor, preferably containing at least one carbonyl group. The entire mixture is UV cured once coated onto a substrate thereby creating a matrix due to crosslinking between the water soluble polymer and the polyvinyl alcohol/polyethylene oxide copolymer or mixture. The result is an ink receptive coating which will absorb many different ink jet inks very rapidly, while exhibiting high gloss. The ink jet medium thereby permits use with many different printers and inks.

11 Claims, 1 Drawing Sheet

GLOSSY INK JET MEDIUM

BACKGROUND OF THE INVENTION

1. Field of the Invention

The present invention relates to ink jet media. More particularly, the present invention relates to novel ink jet media which are glossy and have low ink dry times.

2. Description of the Related Art

As ink jet printers increase in speed and resolution, there is an increasing need for glossy ink jet receiver sheets that will accept large amounts of ink quickly, with short ink dry times, and very low levels of ink bleed, coalescence and print tack. The use of a microporous (i.e. sol gel type) coating is an existing technology that will accept large amounts of ink and dry very rapidly. Two disadvantages of microporous coatings, however, are that they tend to be expensive, and it is very difficult to achieve high sheet glosses. Most polymer based "dense" coatings can achieve high sheet glosses, and can be relatively low cost, but can remain tacky for long periods of time.

There is therefore a need in the industry for a new ink jet receiver sheet that will be very glossy, relatively low cost and have low ink dry times. One object of the present invention is to provide such an ink jet medium.

Another object of the present invention is to provide a method for successfully assembling such an ink jet medium.

These and other objects of the present invention will become apparent to the skilled artisan upon a review of the figures of the drawing, the specification and the claims appended thereto.

SUMMARY OF THE INVENTION

Accordingly, the present invention provides a UV-curable ink jet coating comprised of a copolymer or mixture of polyvinyl alcohol and polyethylene oxide, and a water-soluble polymer which can act as an electron and/or proton donor, preferably containing at least one carbonyl group. The mixture is coated onto a suitable substrate and UV cured to provide the ink jet medium of the present invention.

More particularly, once coated onto a substrate, the entire mixture is UV cured to thereby create a matrix due to crosslinking between the water soluble polymer and the polyvinyl alcohol/polyethylene oxide copolymer or mixture. The result is a coating which will absorb inks very rapidly and exhibits high gloss. Use of the coating in the ink jet medium of the present invention allows the ink jet medium to be successfully used with many different printers and inks.

DETAILED DESCRIPTION OF THE INVENTION

Figure 1:
FIGS. 1 and 2 of the Drawing shows product construction diagrams of the media of Examples 1 and 2, respectively.

The present invention relates to the amalgamation of two existing technologies to create a new method of making aqueous ink jet receptive media, and novel ink jet media. The two existing technologies are the use of water-soluble polymers to receive and dry the aqueous ink and the use of ultra-violet radiation to effect chemical reactions as a method of making coated surfaces.

It has been discovered that the ionic moieties that render a polymeric structure water soluble are also capable of absorbing ultra-violet radiation (i.e. they are chromophores) which leads to an "excited state". This excited state is capable of undergoing photo-chemical reactions with itself or with other polymers that may or may not be in an excited state themselves (i.e. it can react intra and/or inter polymerically). These photochemical reactions are engineered in the present invention to produce a coating with beneficial ink-jet receptive properties with respect to image uniformity, dry time and water resistance. The result is a novel, low cost, effective ink jet medium useful in many different inks and have many different printers.

The ionic moieties of interest are those capable of rendering the water soluble polymer an electron and/or proton donating polymer, and are preferably carbonyl groups which absorb in the UV region at 280 nm. Examples of water soluble polymers with ionic moieties that possess carbonyl chromophores are polyvinyl pyrrolidones (PVP), copolymers thereof, carboxy methyl cellulose (CMC), gelatin, carboxylated polyvinyl alcohol and poly acrylic acid, or a mixture thereof. It is possible to induce photochemical reactions in these polymers via the carbonyl chromophore. Therefore, there is no need for a photo initiator in the coating of the ink jet medium of the present invention.

In addition to the water soluble polymer, the ink receptive coating mixture also contains a polyvinyl alcohol/polyethylene oxide combination. This combination is preferably that of a copolymer, and most preferably, that of a graft copolymer, with which excellent results have been achieved. The combination can also comprise, however, a mixture of the polyvinyl alcohol and polyethylene oxide.

The weight ratio of said copolymer or mixture of polyvinyl alcohol and polyethylene oxide to said water soluble polymer in the coating is generally between 80/20 and 20/80; and preferably between 70/30 and 30/70; and most preferably between 65/35 and 50/50. In a most preferred embodiment, the ink jet coating comprises from 50–60 wt % of a copolymer or mixture of polyvinyl alcohol and polyethylene oxide, and from 30–40 wt % of the water soluble polymer.

Conventional additives can also be present in the coating mixture, such as silica, anti-blocking agents and surfactants. The presence of a silica is a preferred embodiment of the present invention.

The coating of the present invention can be applied to, but is not limited to, the following substrates:
polyethylene clad paper (photobase)
white film
clear film
pressure sensitive adhesive backed, and free standing polyvinyl chloride (PVC)
paper
canvas
spun olefins The coating may be applied as a single layer or multiple layers. If multiple layers are applied, both preferably contain the mixture of water soluble polymer and polyvinyl alcohol/polyethylene oxide copolymer, although not necessarily in the same amounts.

The coating can be applied using conventional techniques. Once applied, the coating is preferably dried and then subjected to UV irradiation. The irradiation is preferably in the wavelength range of from 276 to 290 nm, and is most preferably about 280 nm. The irradiation is sufficient to effect a cure of the coating.

The curing of the coating creates a matrix due to crosslinking between the water soluble polymer in the mixture, and the polyvinyl alcohol/polyethylene oxide copolymer or mixture. The result is an ink jet medium which will absorb ink very rapidly and exhibits very high gloss. Upon absorbing the ink jet ink, the ink receptive coating dries very quickly, and dries with a low amount of print tack. The ink jet medium will advantageously accept a wide variety of inks, e.g., inks that use different co-solvents, which allows the ink jet medium of the present invention to be used with many different printers.

The following examples focus on the beneficial results in ink receptivity achieved when a solid coating of polyvinyl pyrrolidone and a polyvinyl alcohol/polyethylene oxide copolymer mixture is irradiated with UV light. It has been found experimentally that certain graft copolymers of polyvinyl alcohol and polyethylene oxide form a good backbone of an UV curable ink jet ink receptive coating. The preferred resin system based on imaging, gloss, and ink drytime properties is a blend of a polyvinyl alcohol/ethylene glycol graft copolymer, and polyvinyl pyrrolidone as the water soluble polymer.

Hard resins, such as polyurethane emulsions or styrenated acrylic resins can also be added to the ink receptive coating to reduce print tack, and further improve image gloss.

EXAMPLE 1

The following components were gathered:
Deionized Water - - - 38.52
Syloid 620 - - - 0.05 g
Alcotex 975 - - - 29.75 g
Neorez R-9679 - - - 6.08 g
15% PVP K90 - - - 25.50 g
Zonyl FSN - - - 0.10 g A mix was prepared by dispersing the Syloid 620 and deionized water on a Lightn+ in mixer for one minute. The Alcotex 975, PVP K90 solution were added and mixed for 5 minutes. The Neorez R-9679 and Zonyl FSN were added, then mixed for an additional 5 minutes with the Lightn' in mixer.

The composition was then coated onto R250G photobase with a gapped 100 rod to achieve a dry coating weight of about 3.5 lb/MSF. The coating was dried in a laboratory Blue M convection oven for 3 minutes at 220° F. The resulting medium is shown in FIG. 1 of the Drawing.

The sample was then run through an UV cure unit by RPC industries at 50 fpm giving an output of about 0.56 J/cm2.

The sample was then printed on an Epson 5000 printer using a full color test pattern. Visual densities of cyan, magenta, yellow, red, green, blue, and black were run using an XRITE 938 color densito-meter. Gloss readings at 60 degree were taken in the non-imaged areas and also in the secondary colors (red, green, blue). All results can be seen in Table 1.

EXAMPLE 2

A precoat mix was prepared in the following manner:
Deionized Water - - - 30.23 g
Additive Neorez R-9679 - - - 45.64 g
15% PVP K90 (aqueous) - - - 21.11 g
Alcotex 975 - - - 3.02 g The above precoat mix was prepared by weighing the deionized water into a mixing vessel. The Neorez, PVP K90 solution and Alcotex 975 were added and mixed for 15 minutes at moderated speed on a Lightn' in mixer.

The composition was then coated onto R250G photo-base with a gapped 70 Mayer rod to achieve a dry coating weight of about 3.5 lb/MSF. The coating was dried in a laboratory Blue M convection oven for 3 minutes at 220° F.

Figure 2:
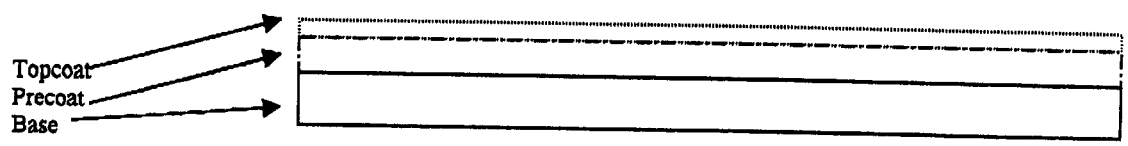

A topcoat mix was prepared in the same manner as above, with the following composition:
Deionized Water - - - 15.11 g
Syloid 620 - - - 0.05 g
Alcotex 975 - - - 7.85 g
15% PVP K90 - - - 54.92 g
12.5% Gohsenal T-330H - - - 21.97 g
Zonyl FSJ - - - 0.10 g The topcoat was coated on top of the precoated sample with a gapped 50 Mayer Rod, to achieve a dry coating weight of about 1.8 lbs/MSF. The resulting medium is illustrated in FIG. 2 of the Drawing.

The sample was then UV cured, printed, and evaluated in the same manner as Example 1. The results can be seen in Table 1.

COMPARATIVE EXAMPLE

This sample used the same mix, and was coated and dried in the same manner as Example 1. This sample, however was not UV cured. The sample was then printed and evaluated as Example 1. The results can also be seen in Table 1.

TABLE 1

|  | Example 1 | Example 2 | Comparative Example |
|---|---|---|---|
| Print Quality | Good to Very Good | Very Good | Moderate to Poor |
| Ink Dry Time | 2 minutes 20 seconds | 0 minutes 20 seconds | 5 minutes 30 seconds |
| Sheet Gloss (60 degree) | 95 | 95 | 71 |
| Print Tack (in 300% ink) | Good | Very Good | Very Poor |

In the foregoing examples, the following is a more detailed description of the components used:

Syloid 620—Amorphous silica from W. R. Grace of Baltimore, N. Mex.

Alcotex 975—Polyvinyl alcohol/Polyethylene oxide graft copolymer from Harlow Chemical Company Ltd. of Harlow, U. K. −35% solids.

PVP K90—Polyvinyl pyrrolidone from International Speciality Polymers of Wayne, N.J. −15% solids.

Zonyl FSN—Nonionic fluorosurfactant from DuPont of Wilmington Del.

Zonyl FSJ—Anionic fluorosurfactant from DuPont of Wilmington Del. UV processor —RPC Industries of Plainfield, Il.

Gohsenal T-330H—Carboxylated polyvinyl alcohol from Nippon Gohsei of Osaka, Japan.

Neorez R-9679—Urethane emulsion from Zeneca Resins of Wilmington, Mass. −38% solids. Useful additive which improves the speed of curing due to acid groups.

R-250G—Polyethylene clad glossy photobase paper from Schoeller Technical Papers of Pulaski, N.Y.

While the invention has been explained in relation to its preferred embodiments, it is to be understood that various modifications thereof will become apparent to those skilled in the art upon reviewing the specification. Therefore, it is to be understood that the invention disclosed to you and is intended to cover such modifications has fall within the scope of the appended claims.

What is claimed is:

1. A method of making an ink-jet recording medium comprising the steps of:
   (a) coating a substrate with a coating comprising a resin component consisting essentially of a copolymer or mixture of polyvinyl alcohol and polyethylene oxide and a water-soluble polymer comprising ionic moities while can act as an electron donor and/or proton donor; and
   (b) curing said coating with UV light.

2. The method of claim 1, wherein at least one further coating is applied to said substrate.

3. The method of claim 2, wherein the further coating resin component also consists essentially of a water soluble polymer and an polyvinyl alcohol and polyethylene oxide copolymer or mixture.

4. The method of claim 1, wherein the coating is dried in an oven before curing.

5. The method of claim 1, wherein the UV light comprises light with a wavelength of about 280 nm.

6. The method of claim 1, wherein said water-soluble polymer is selected from the group consisting of polyvinyl pyrrolidone, carboxy methyl cellulose, gelatin, caroboxylated polyvinyl alcohol and polyacrylic acid.

7. The method of claim 6, wherein said water-soluble polymer is polyacrylic acid or polyvinyl pyrrolidone.

8. The method of claim 1, wherein the weight ratio of said copolymer to said water-soluble polymer is between 80/20 and 20/80.

9. The method of claim 8, wherein the weight ratio is between 70/30 and 30/70.

10. The method of claim 1, further comprising coating a second layer over the coating of (a), which second layer comprises a copolymer of mixture of polyvinyl alcohol and polyethylene oxide and a water-soluble polymer comprising ionic moieties which can act as an electron donor and/or proton donor, which second layer is also cured.

11. The method of claim 10, wherein the relative amounts of the copolymer or mixture and water-soluble polymer differ between the two layers.

* * * * *